(No Model.)
L. N. LOOMIS.
ANIMAL TRAP.
No. 409,212. Patented Aug. 20, 1889.
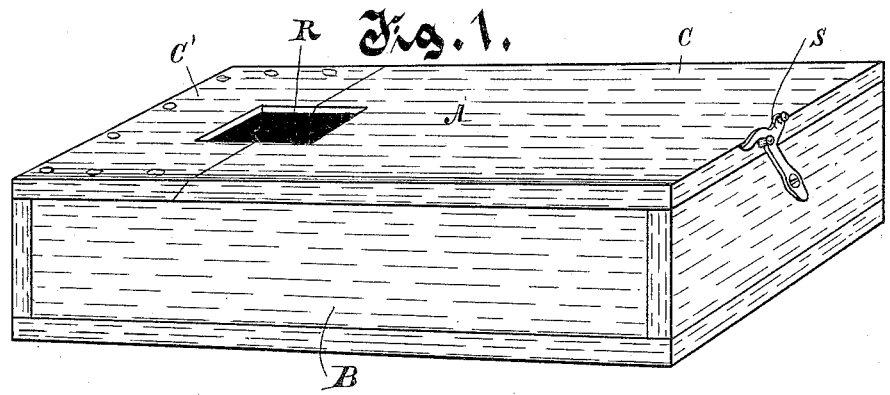
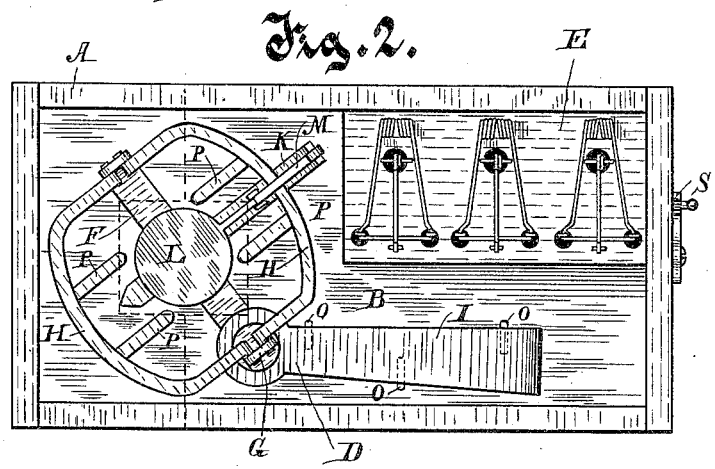
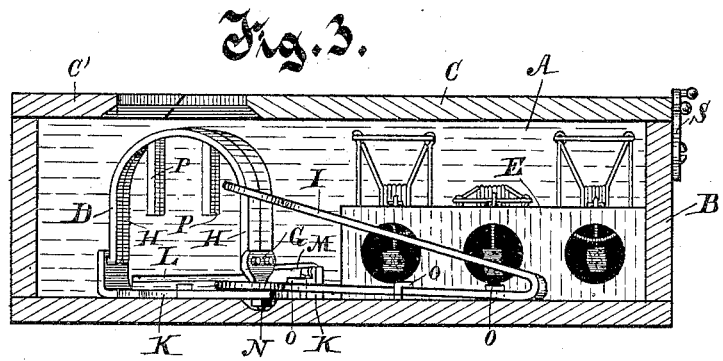
Witnesses:
C. H. Keeney,
Anna Faust.
Inventor.
Lysander N. Loomis
By Erwin Benedict
Attorneys.

UNITED STATES PATENT OFFICE.

LYSANDER N. LOOMIS, OF WAUWATOSA, WISCONSIN.

ANIMAL-TRAP.

SPECIFICATION forming part of Letters Patent No. 409,212, dated August 20, 1889.

Application filed April 20, 1889. Serial No. 307,955. (No model.)

*To all whom it may concern:*

Be it known that I, LYSANDER N. LOOMIS, of Wauwatosa, in the county of Milwaukee and State of Wisconsin, have invented new and useful Improvements in Animal-Traps; and I do hereby declare the following to be a full, clear, and exact description of said invention, reference being had to the accompanying drawings, and to the letters or figures of reference marked thereon, which form a part of this specification.

It is well known that mice and rats exhibit a certain amount of caution and shrewdness in avoiding traps set for them, especially in open places, and that they have the inclination and habit of entering small holes leading into dark or obscure nooks and corners in the hope of finding crumbs of food, and it is with reference to these characteristics and habits of mice and rats that my improved form of animal-trap is constructed.

In the drawings, Figure 1 is a perspective view of the case of the trap. Fig. 2 is a plan of the trap, the covering being removed from the case. Fig. 3 is an elevation of the trap, one side being removed, showing the interior.

The case A is constructed of wood, since wood is deemed more desirable for the case than sheet metal, as sheet metal is liable to be elastic and noisy, thereby frightening away mice or rats that climb onto it. The case A consists of the bottom, sides, and ends forming the main part of the case B and the cover divided into two parts C and C'. The main part B of the case is constructed of such size as just conveniently to take in a double-jawed spring animal-trap D, and also, preferably, a small spring mouse-trap E, in the manner shown in Figs. 2 and 3. The trap D consists of the base-piece F, the removable post G, jaws H H, hinged in the post G and in the upturned end of the base-piece F, the bent spring I, one arm of which is secured about the post G, and the free arm of which is provided with an aperture through which the jaws H H pass, the cross-bar K, and the thereto-hinged plate L and latch M, adapted to engage with the plate L for setting the trap. This trap is intended and adapted to be located and set in the case in the manner shown in Fig. 2, a small recess N being made in the bottom of the case for the reception therein of a nut which turns on the lower end of the post G, which nut entering the recess N is adapted to retain the trap in position in the case against lateral or endwise movement, and the trap is further secured, and in the absence of the nut may be entirely secured, to the case by means of the bent pins O O, one end of which is forced into the bottom of the case and the other arm of which is turned over the lower arm of the spring I like a button.

This trap as ordinarily constructed is of a size adapted for catching rats, and the latch M, when the trap is set, usually engages so firmly in a notch therefor in the arm of the plate L that a smaller animal, like a mouse, in stepping on the plate will not spring the trap, and if by wear of the parts the engagement between the latch and plate is so slight as to be disengaged by the weight of a mouse still the jaws of the trap as ordinarily constructed are spread too much to surely catch so small an animal as a mouse, and to obviate this defect I have added a pair of prongs P P to each of the jaws H H, which prongs project inwardly and divide the space between the ends of the jaws, but are near enough together to catch a mouse against them. Besides the trap D, I also preferably use in the case A a small wire spring mouse-trap E of the form in common use, but having the entrances all on one side, this mouse-trap being adapted to catch any mice that may enter the case and pass over the trap D without springing it. The cover of the case is provided with an aperture R, preferably made rectangular and located directly over the plate L when the trap is set in the case, as shown in Fig. 2. The cover of the case is divided into two parts C and C', the part C' being secured rigidly to the top of the main part of the case and the part C being secured thereto removably by having its front end beveled off and extending somewhat under the beveled end of the part C', and the hook S, pivoted on the part B, engaging with a pin fixed in the part C.

It will be understood that by throwing back the hook S the part C may be readily removed from the case, when a proper bait can be put in it, and the trap may then be set and placed within the part B, and the part of the cover C being then replaced and secured in position the trap is to be placed away in some cellar or locality where the animals to be caught are likely to find it. The morsels of food for bait are to be placed within the case, and preferably some of them beneath the spring-trap D. The aperture R is made of such size that a rat can just readily pass through it, and in going through, attracted by the bait, will project its nose directly downward against the plate L, whereby the trap will be sprung and the animal caught and instantly killed. Should the locality be infested with mice, these may enter the case and be caught in the trap E and the trap D still remain set in position to catch any rat that may possibly thereafter attempt to enter the case.

What I claim as new, and desire to secure by Letters Patent, is—

1. The combination, with a case A, having an aperture R in its cover and a portion of the cover about a part of the aperture removable, of a trap having jaws H H, spring I, trigger-plate L, and latch M, the trap being located within the case in such manner that the trigger-plate L is directly below and at a short distance from the aperture R, substantially as described.

2. The combination, with a case A, having an aperture R in its cover, of a spring-trap having jaws H H and two prongs P P projecting inwardly from each of the jaws, substantially as described.

In testimony whereof I affix my signature in presence of two witnesses.

LYSANDER N. LOOMIS.

Witnesses:
C. T. BENEDICT,
JAS. B. ERWIN.